US006373536B1

(12) United States Patent
Mell et al.

(10) Patent No.: US 6,373,536 B1
(45) Date of Patent: Apr. 16, 2002

(54) LATCH FOR AN ON-BOARD ENTERTAINMENT SYSTEM

(75) Inventors: Richard C. Mell, Brea; S. Scott Seeley, Corona; Gerald E. Lester, Costa Mesa; Stephen R. Boss, Claremont, all of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/651,194

(22) Filed: Aug. 30, 2000

(51) Int. Cl.[7] .................................................. H04H 5/64
(52) U.S. Cl. ........................ 348/837; 292/220
(58) Field of Search ..................... 348/836, 837; 312/7.2, 246; 292/220, 195, 203

(56) References Cited

U.S. PATENT DOCUMENTS

| | | | | | |
|---|---|---|---|---|---|
| 4,782,674 A | * | 11/1988 | Johnson | ....................... | 292/220 |
| 5,467,106 A | * | 11/1995 | Salomon | ....................... | 345/87 |
| 5,946,055 A | * | 8/1999 | Rosen | ......................... | 348/836 |

* cited by examiner

Primary Examiner—Peter M. Cuomo
Assistant Examiner—Jerry A. Anderson
(74) Attorney, Agent, or Firm—Nathan O. Jensen; Kyle Eppele

(57) ABSTRACT

A system and method for safe and secure stowage of an on-board entertainment display utilizing at least one dual biased latch in the stowage compartment and a complementary recess in the display assembly such that the latch prohibits un-commanded display deployment, even in the absence of electrical power to the unit.

3 Claims, 4 Drawing Sheets

LATCH FOR AN ON-BOARD ENTERTAINMENT SYSTEM

BACKGROUND OF THE INVENTION

This invention relates to entertainment systems and more specifically to display housing systems integrated into entertainment systems utilized on transportation vehicles.

Today's world involves numerous situations in which one is required to endure trips of varying distance and time for both pleasure and work reasons. To accomplish these travels a wide assortment of personal and commercial vehicles including automobiles, buses, ships, trains and aircraft are relied upon on a daily basis. For those individuals not operating the respective vehicle, the duration of the trip provides a captive situation which is often addressed by access to wireless broadcast information, such as television, or viewing pre-recorded information stored on the vehicle for playback during the trip. Such systems are often referred to as in-flight or mobile entertainment systems. With advances in electronics in recent years, with respect to size, cost and ruggedness, such in-flight entertainment systems are commonly found in numerous vehicles.

One drawback to the present day utilization of in-flight entertainment systems, is the maintenance associated with the display or monitor stowage and deployment. In order to provide maximum viewing access, the physical location of the display or monitor often subjects the device to excessive stress, both planar and rotational, when deployed. Additionally, the operating environment of such entertainment systems is often characterized by high vibration and deliberate misuse attempts to deploy or retract the display. The un-commanded deployment of the system display or the failure of the housing of the entertainment system are highly undesirable, yet relatively frequent occurrences in currently utilized devices.

Accordingly, an in-flight entertainment system incorporating a display housing system that secures stowage in all situations including loss of system power.

SUMMARY OF INVENTION

The present invention relates to an entertainment system for use in vehicular applications that comprises a housing system integrating latches, recesses and stops in a unique configuration so as to minimize un-commanded movement of the display of the entertainment system. A housing assembly having a compartment for stowing the display portion of an on-board entertainment system is disclosed having at least one elongated latch affixed to the internal surface of the stowage compartment having a wedge designed to engage a complementary recess on the display housing. The lever arm is biased and coupled to an actuator device that upon receipt of a command signal disposes the lever arm in a direction of travel away from the display housing, thereby allowing free movement of the display housing to a deployed position. Upon stowage the lever arm is again commanded away from the display-housing surface, allowing the display to enter the stowage compartment and over-travel the lever arm. The lever arm is then released to its un-commanded position, and retains the monitor in the stowed position.

It is an object of the present invention to provide a system for securing hidden display assemblies of on-board entertainment systems, both in routine and emergency situations.

It is a feature of the present invention to incorporate at least one biased lever to engage the housing of the on-board entertainment system stowed display.

It is an advantage of the present invention to provide an on-board entertainment system having a storable display, with greatly improved non-commanded deployment, as contrasted to prior art systems.

These and other objects, features, and advantages are disclosed in the specification, figures, and claims of the present invention.

DETAILED DESCRIPTION

Figure 1:
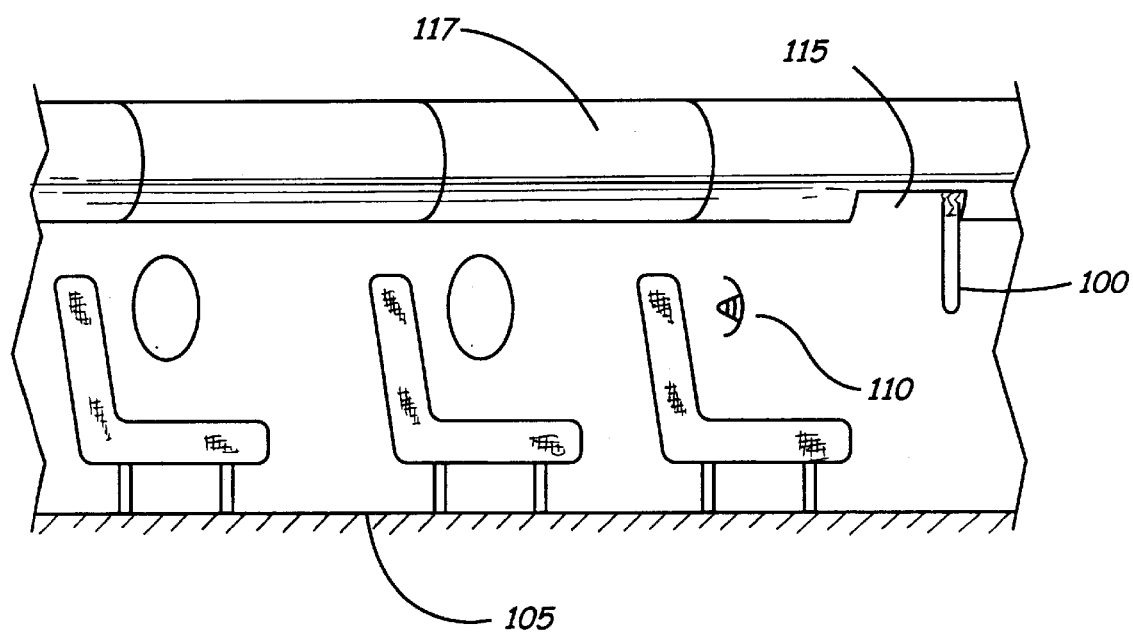
FIG. 1 is a diagrammatic view of an on-board entertainment system that incorporates the teachings of the present invention.

Referring now to the drawings wherein like numerals refer to like matter throughout, FIG. 1 shows the display 100 of an entertainment/information system in the passenger portion of a vehicle 105, which incorporates the teachings of the present invention. The display is depicted in a deployed or extended position from its stowed location in cavity 115 of the ceiling panel 117 of the vehicle 105.

Figure 2:
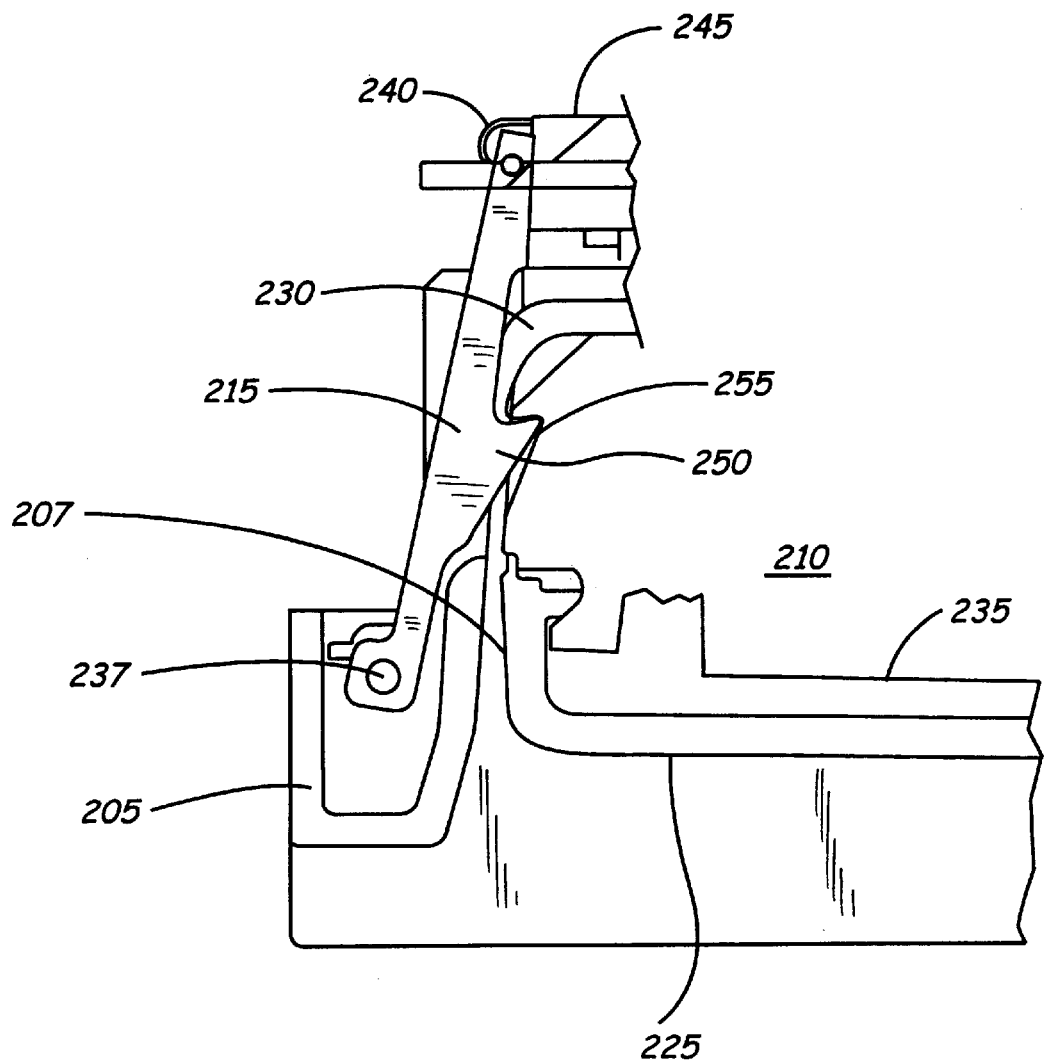
FIG. 2 is a partial cross-section view of one embodiment a stowed display assembly of an on-board entertainment system that incorporates the teachings of the present invention.

FIG. 2 illustrates a cross-sectional partial view of, a stowed on-board entertainment system display assembly of one embodiment that incorporates the teachings of the present invention. As shown, a display mounting structure 205, such as may be the overhead liner or luggage stowage compartment of a vehicle having an on-board entertainment system. The mounting structure 205, includes an integral cavity 207 for stowage of display assembly 210, when the display is not in use or and during select portions of vehicle travel. Affixed to the interior surface of the mounting structure 205, proximate to said cavity 207 and display assembly 210, is found an elongated lever arm 215. It is understood that the mounting cavity 207 is of such dimensions so as to accommodate the entire display assembly.

Display assembly 210 is comprised of matched encasements 225 and 230 that retain and support a flat panel display 235 for graphical representation of information by the on-board entertainment system via signal cabling (not shown).

Figure 3:
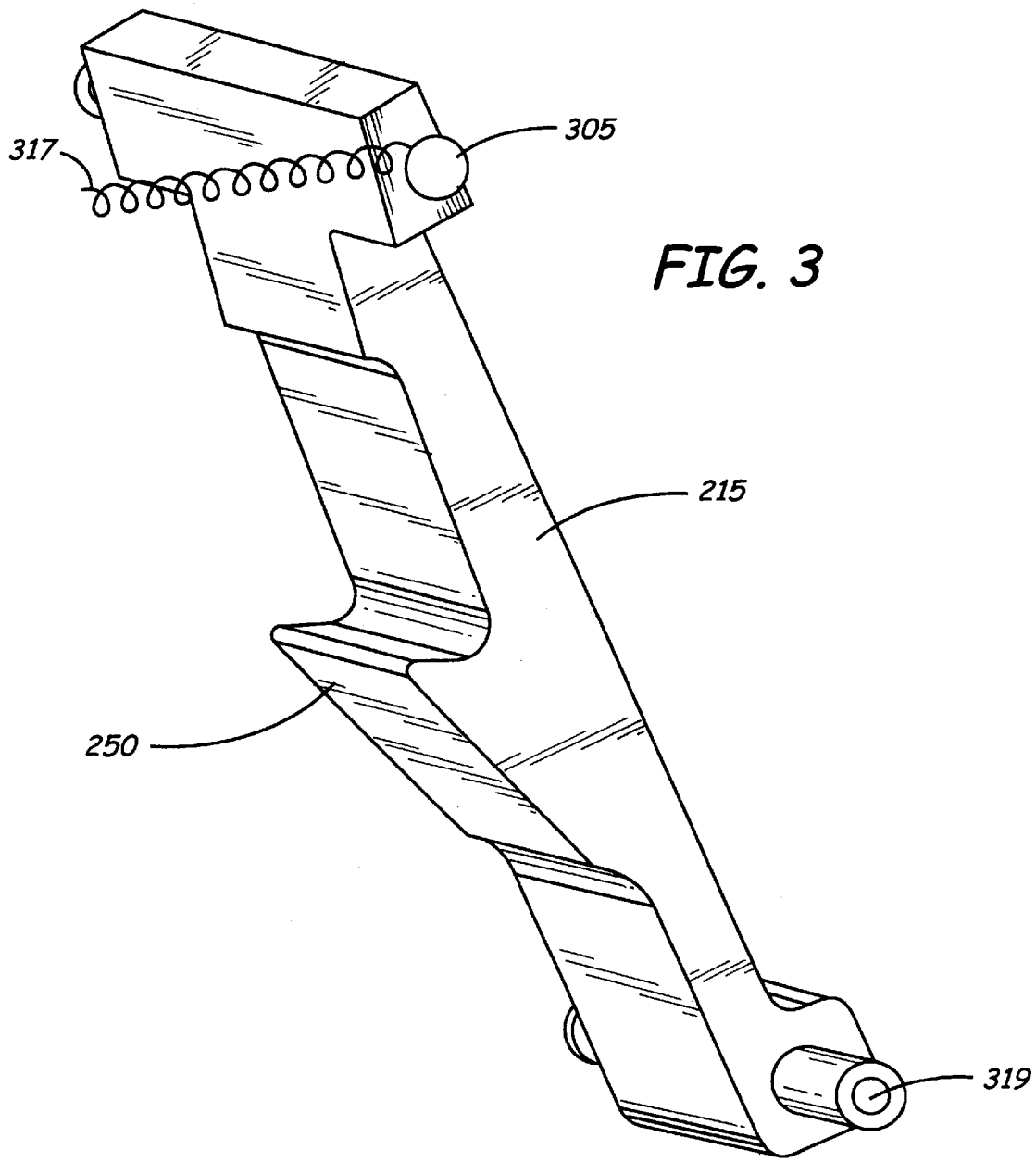
FIG. 3 is perspective illustration of one embodiment of the latch lever of the present invention.
Figure 4:
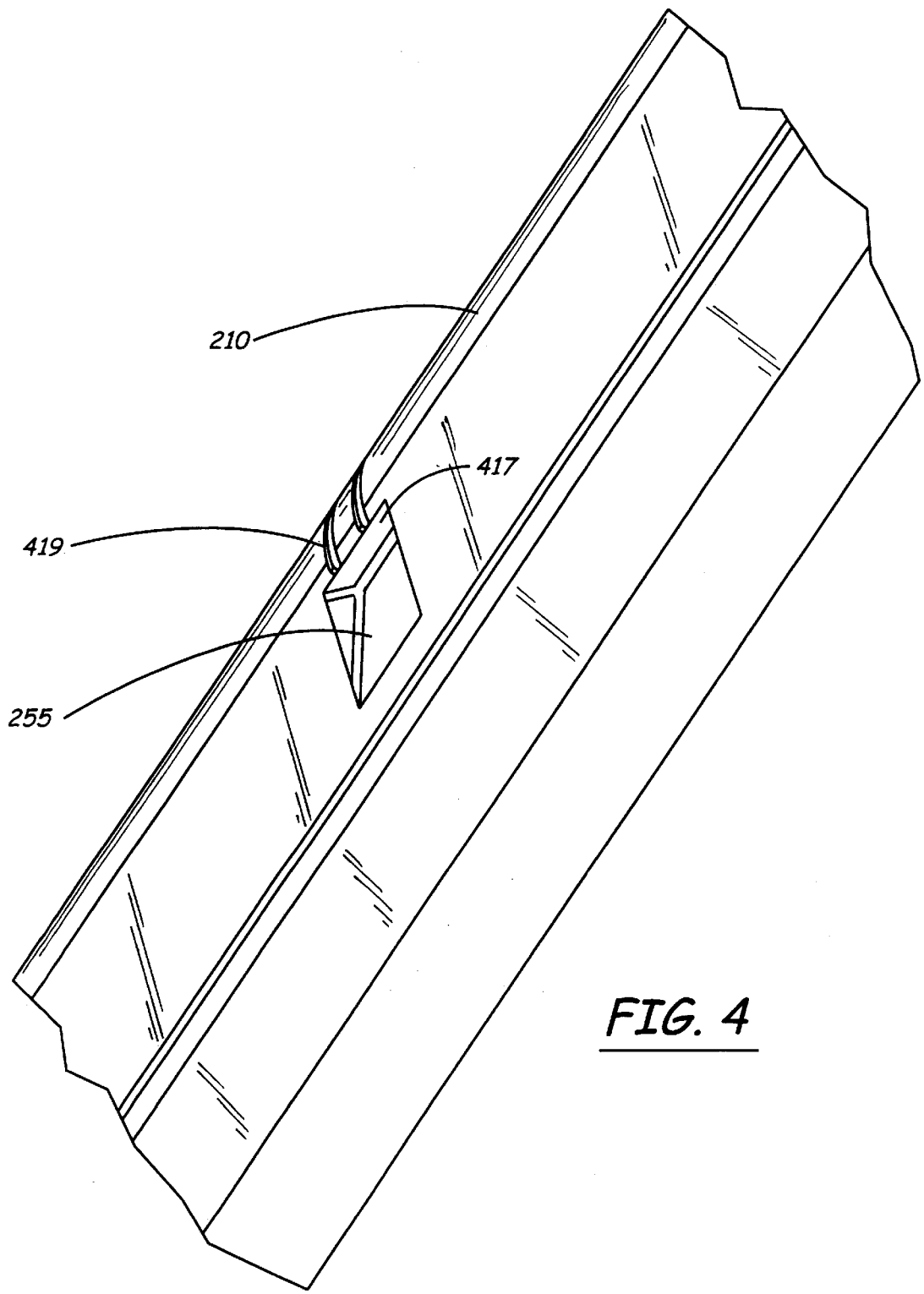
FIG. 4 is a perspective view of a display housing having a recessed cavity for engagement of the latch lever of FIG. 3.

Elongated lever arm 215 is affixed to the mounting structure 205 via a coupler 237 at a first distal region of said lever 215 and also at an opposite distal region via biasing means 240. An actuator device 245 is disposed between the mounting structure 205 at the distal region of elongated lever 215 contiguous with biasing means 240. Also integrated within elongated lever arm 215, is an engagement surface 250, as shown a wedge, proximately located in the mid-portion of the lever arm and complementary to a recessed area 255 of the display assembly 210. FIGS. 3 and 4 illustrate alternate and isolated views of the elongated lever arm 215 and the recessed cavity 255 respectively.

In operation the actuator, which may be a linear electric servo device, receives a release signal thereby extending lever arm 215 a sufficient distance from encasement 230 such that the display assembly weight and/or a deployment motor move the stowed display assembly past the lever latch, on its way to the preferred deployed position. On retract the design of the lever wedge allows for the free movement of the display to a stowed position. In the stowed position the biasing means engages the encasement to retain the display in the stowed position.

In the preferred embodiment of the present invention, the display assembly is rotatably hinged along its top edge, such that the deployment movement of the display assembly comprises the "lowering" of the bottom edge of the assembly, which contains the engagement section of the latch mechanism. A single latch is sufficient to accomplish advantages of the present invention, although multiple latches and respective engagement areas could be located along either or both sides of the display assembly, as deemed appropriate by the system designer or operational environment.

FIG. 3 is perspective illustration of one embodiment of the elongated lever arm 215 of the present invention. As shown, the elongated lever arm includes integrated on its top distal region, a region 305 for attachment of a biasing means 317. The biasing means, as shown a coiled spring of appropriate tension to retain the lever arm against the housing system up to predetermined forces, is affixed at its other end to the non-movable portion of the display housing compartment. At the opposite distal region of the elongated lever, a pivot pin 319 is assembled through a passage way and in combination allow for controlled movement of the lever arm in a response to application or removal of an applied force from an actuator (See FIG. 2).

FIG. 4 is a perspective view of a display housing having a recessed cavity for engagement of the latch lever of FIG. 3. The recessed cavity 255 is integrated into the bottom edge portion of an extended display and is oriented such that the engagement region of elongated lever arm 215 contacts a cantered surface 417 of the cavity region. The combination of the angular relationship between the contact surface of the elongated lever arm and the cavity region improves the retention the display device in the stowed position, until intentionally released. Additionally, contact pads 419 may be affixed to the display assembly housing to minimize physical wear due to repeated contact with the lever 215.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

We claim:

1. A system for securing a display on an on-board entertainment system comprising:
   a storage compartment having a cavity area for accommodating a display assembly of the on-board entertainment system;
   at least one elongated latching lever having a distal region at a first end and an opposite second end, pivotally affixed at the distal region to an interior wall of the storage compartment cavity area;
   an actuator for movement of the lever;
   the actuator being coupled to said lever at said second end;
   biasing mechanism in physical contact with said lever at said second end;
   a display housing having a recessed region complementary in location and design to a contact area of the lever between said ends;
   wherein the actuator overcomes the biasing mechanism, resulting in the disengagement of the lever from the display and contemporaneous deployment of the on-board entertainment display assembly;
   wherein the elongated latching lever is attached at said distal region by a pivot pin inserted in the elongated latching lever;
   wherein the biasing mechanism is comprised of one or more springs affixed to the elongated latching lever;
   wherein the actuator is an electric servo that extends an element in contact with said elongated latching lever, in a linear fashion in order to release the display; and
   wherein the elongated latching lever is affixed to the storage compartment, such that said elongated latching lever engages a lower edge of the display assembly, said lower edge including said recessed region for elongated latching lever contact.

2. A latch system for securing in a storage compartment a storable display on an on-board entertainment system comprising:
   at least one elongated latching lever having a distal region at a first end and an opposite second end, pivotally affixed at the distal region to an interior wall of the storage compartment;
   an actuator for movement of the lever;
   the actuator being coupled to said lever at said second end;
   biasing mechanism in physical contact with said lever at said second end;
   a display housing having a recessed region complementary in location and design to a contact area of the lever between said ends;
   wherein the actuator overcomes the biasing mechanism, resulting in the disengagement of the lever from the display and contemporaneous deployment of the on-board entertainment display assembly;
   wherein the elongated latching lever is attached at said distal region via a pivot pin inserted in the elongated latching lever;
   wherein the actuator is an electric servo that extends an element in contact with said elongated latching lever, in a linear fashion in order to release the stored display; and
   wherein the elongated latching lever is affixed to the storage compartment, such that said elongated latching lever engages a lower edge of a stowed display assembly, said lower edge including said recessed region for elongated latching lever contact.

3. A system comprising:
   a member on-board a vehicle;
   said member having a cavity area configured receiving therein a display device;
   an elongated latching lever having a first end and an opposing second end;
   said lever pivotally affixed, at said first end to said member;
   an electric actuator being coupled to said member;
   said display device having a region which is complementary in location and configuration to a contact area of said lever between said ends;

a biasing means, in contact with said lever at said second end, said biasing means for biasing said contact area of said lever into engagement with said region; and, when said display device is disposed in a stowed position in said cavity area, said electric actuator being configured to extend an element into contact with said second end so as to overcome a biasing force applied by said biasing means, thereby resulting in disengagement of said contact area from said region and allowing a deployment of the display device.

* * * * *